(12) United States Patent
Yamanaka

(10) Patent No.: US 12,205,394 B2
(45) Date of Patent: Jan. 21, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Satoru Yamanaka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 289 days.

(21) Appl. No.: 17/708,772

(22) Filed: Mar. 30, 2022

(65) Prior Publication Data

US 2022/0343666 A1    Oct. 27, 2022

(30) Foreign Application Priority Data

Apr. 23, 2021    (JP) ................................. 2021-073188

(51) Int. Cl.
*G06V 30/414* (2022.01)
*G06V 30/18* (2022.01)
*G06V 30/19* (2022.01)
*G06V 30/199* (2022.01)

(52) U.S. Cl.
CPC ...... *G06V 30/414* (2022.01); *G06V 30/18105* (2022.01); *G06V 30/19107* (2022.01); *G06V 30/199* (2022.01)

(58) Field of Classification Search
CPC .............................................. G06V 30/00–43
See application file for complete search history.

(56) References Cited

U.S. PATENT DOCUMENTS

| 6,563,949 B1 * | 5/2003 | Takebe ................. G06V 30/416 382/164 |
| 8,666,185 B2 * | 3/2014 | Dauw ...................... H04N 1/41 382/292 |
| 2002/0021840 A1 * | 2/2002 | Ohara ....................... G06T 7/12 382/199 |
| 2005/0180645 A1 * | 8/2005 | Hasegawa .......... H04N 1/40062 382/302 |
| 2007/0237408 A1 * | 10/2007 | Yasunaga ............. H04N 1/6072 382/176 |

(Continued)

FOREIGN PATENT DOCUMENTS

| CN | 107358184 A | * 11/2017 | |
| CN | 110427891 A | * 11/2019 | ......... G06K 9/00442 |
| JP | 2018-139457 A | 9/2018 | |

*Primary Examiner* — Sean T Motsinger
(74) *Attorney, Agent, or Firm* — VENABLE LLP

(57) ABSTRACT

To make it possible to extract character information with a high accuracy even from a document image obtained by reading a document in which a logo mark or the like overlaps a character portion. By performing binarization processing for a document image obtained by reading a document, a binary image including first pixels representing a color darker than a reference and second pixels representing a color paler than the reference is generated. Then, by changing the pixel among the first pixels included in the generated binary image, whose corresponding pixel's color in the document image is different from a color of a character object within the document, to the second pixel, a binary image in which a background object that overlaps the character object in the document image is removed is generated.

13 Claims, 11 Drawing Sheets

(56) References Cited

U.S. PATENT DOCUMENTS

| | | | |
|---|---|---|---|
| 2008/0187225 A1* | 8/2008 | Katsuyama | G06V 20/635 |
| | | | 382/190 |
| 2010/0259558 A1* | 10/2010 | Oba | G06V 30/155 |
| | | | 345/619 |
| 2019/0340429 A1* | 11/2019 | Berseth | G06F 16/22 |
| 2021/0192262 A1* | 6/2021 | Yamanaka | G06V 30/1444 |
| 2021/0192695 A1* | 6/2021 | Kosaka | G06T 7/90 |
| 2022/0343666 A1* | 10/2022 | Yamanaka | G06V 30/199 |

* cited by examiner

IMAGE PROCESSING APPARATUS, IMAGE PROCESSING METHOD, AND STORAGE MEDIUM

BACKGROUND OF THE INVENTION

Field

The present disclosure relates to an image processing technique to correct a document image.

Description of the Related Art

In recent years, a system is utilized which aims at improvement of efficiency in accounting work by extracting character information by performing optical character recognition processing (in the following, described as "OCR processing") for a scanned image (document image) of a document, such as a receipt and a business form. As character information that is extracted from a document image, mention is made of date, total amount, company name and the like and based on the name, unit, and format of each item, character information is obtained as a value corresponding to a specific item (key). Here, in some document image, there is a case where a logo mark, an imprint or the like overlaps a character portion. For the document image such as this, the color of a logo mark or the like, which is the background of the character, prevents the OCR processing from functioning well and there is a case where it is not possible to extract character information accurately. In this regard, Japanese Patent Laid-Open No. 2018-139457 has disclosed a technique to enable extraction of character information from a document image in a case where a character portion is filled in with a color marking pen. Specifically, for the area among the areas determined to be a character area, in which it is difficult to separate the background from a character in the results of performing binarization processing for a document image, by performing binarization processing again, it is made possible to extract character information.

With the technique of Japanese Patent Laid-Open No. 2018-139457 described above, the area determined to be a character area is taken as a processing target, and in a case where the size and the aspect ratio of the area, such as the logo mark or the like overlapping the character, are those with which the area is not determined to be a character area, it is not possible to separate characters and the background.

SUMMARY

An image processing apparatus according to the present disclosure includes: one or more memories storing instructions; and one or more processors executing the instructions to: generate, by performing binarization processing for a document image obtained by reading a document, a first binary image including first pixels representing a color darker than a reference level in the document image and second pixels representing a color paler than the reference level; and generate, by changing the pixel among the first pixels included in the generated first binary image, whose corresponding pixel's color in the document image is different from a color of a character object within the document, to the second pixel, a second binary image in which a background object that overlaps the character object in the document image is removed.

Further features of the present disclosure will become apparent from the following description of exemplary embodiments with reference to the attached drawings.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
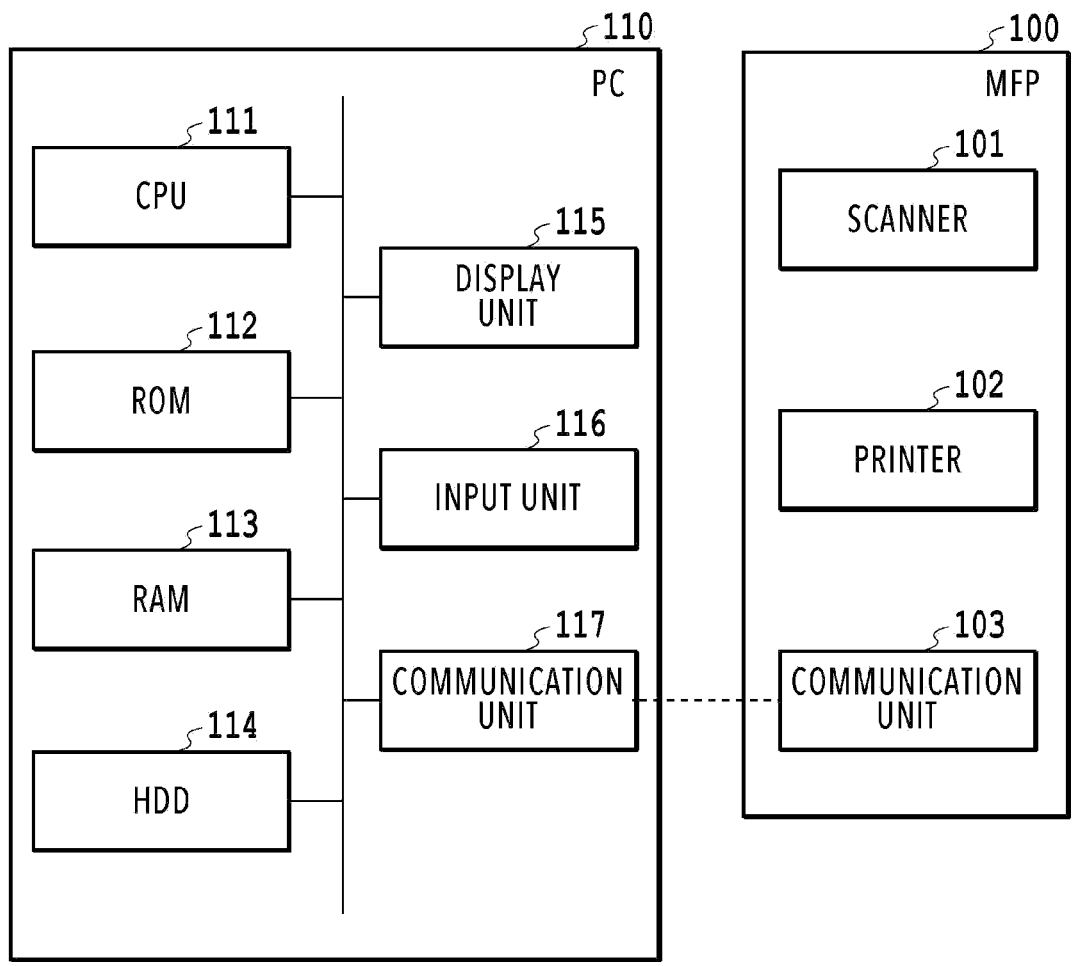
FIG. 1 is a diagram showing a general configuration of an information processing system.

FIG. 1 is a diagram showing a general configuration of an information processing system according to the present embodiment. The information processing system has an MFP 100 and a PC 110. The MFP 100 has a scanner 101, a printer 102, and a communication unit 103. The scanner 101 generates a scanned image by scanning a document, such as a receipt and a business form. The printer 102 forms an image on a sheet and outputs the sheet based on a print image that is sent from the PC 110 and a scanned image generated by the scanner 101. The communication unit 103 performs communication with external devices, including the PC 110, via a network.

The PC 110, which is an image processing apparatus, has a CPU 111, a ROM 112, a RAM 113, an HDD 114, a display unit 115, an input unit 116, and a communication unit 117. The CPU 111 is a computing device that comprehensively controls the PC 110 and performs various kinds of processing by reading control programs stored in the ROM 112. The RAM 113 is used as a temporary storage area, such as a main memory and a work area, of the CPU 111. The HDD 114 is a large-capacity storage device that stores various kinds of data, various programs and the like. The functions and processing of the PC 110, to be described later, are implemented by the CPU 111 reading programs stored in the ROM 112 or the HDD 114 and loading the programs onto the RAM 113 and executing the programs. The communication unit 117 performs communication processing with external devices including the MFP 100 via a network. The display unit 115 displays various kinds of information. The input unit 116 has a keyboard and a mouse and receives various operations by a user. It may also be possible to provide the display unit 115 and the input unit 116 as one unit, such as a touch panel. Further, the display unit 115 may be a unit that performs projection by a projector and the input unit 116 may be a unit configured to recognize the position of a fingertip on a projected image with a camera.

In the present embodiment, data of an image (in the following, described as "document image") obtained by scanning a document, such as a business form, with the scanner 101 of the MFP 100 is transmitted to the PC 110 by the communication unit 103. Then, in a case where the data of the document image, which is received by the communication unit 117 of the PC 110, is stored in the HDD 114, prior to OCR processing, processing to remove a color background that overlaps a character within the document image is performed.

<Color Background Removal Processing>

Figure 2:
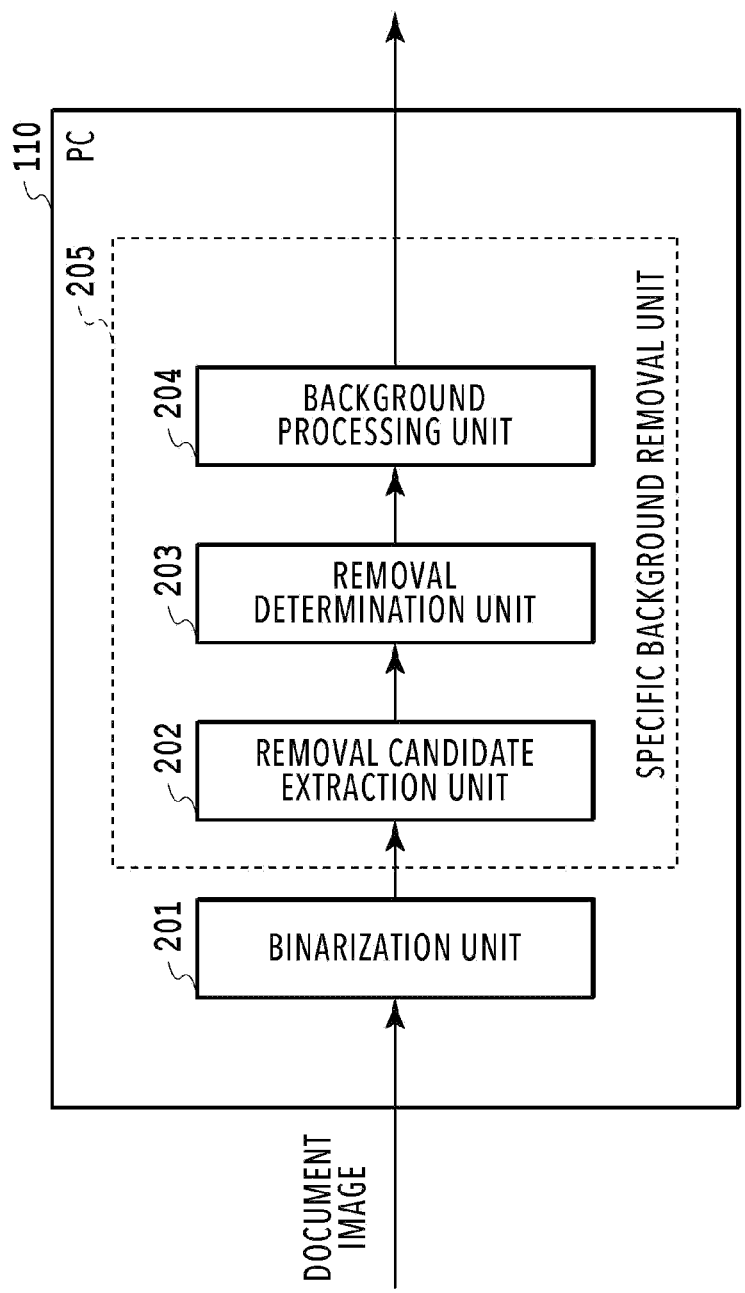
FIG. 2 is a block diagram showing functions for implementing color background removal processing according to a first embodiment.
Figure 3:
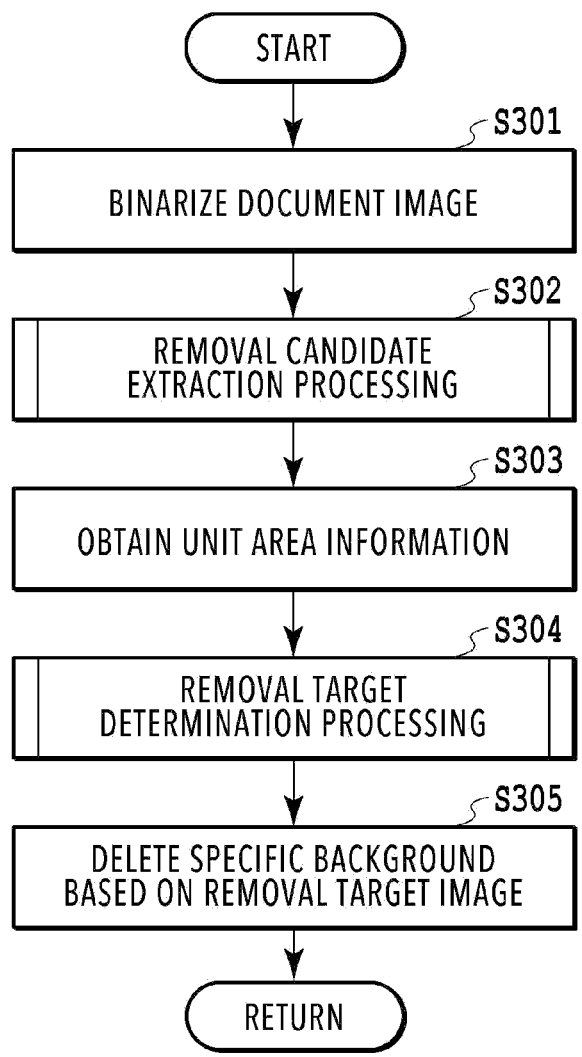
FIG. 3 is a flowchart showing a flow of color background removal processing according to the first embodiment.

FIG. 2 is a block diagram of function units for implementing processing (color background removal processing) to remove a color background object that overlaps a character object for the document image that is input to the PC 110 according to the present embodiment. Further, FIG. 3 is a flowchart showing a flow of the color background removal processing according to the present embodiment. In the following, with reference to the block diagram in FIG. 2 and the flowchart in FIG. 3, the color background removal processing of the present embodiment is explained. In the following explanation, symbol "S" means a step.

Figure 4:
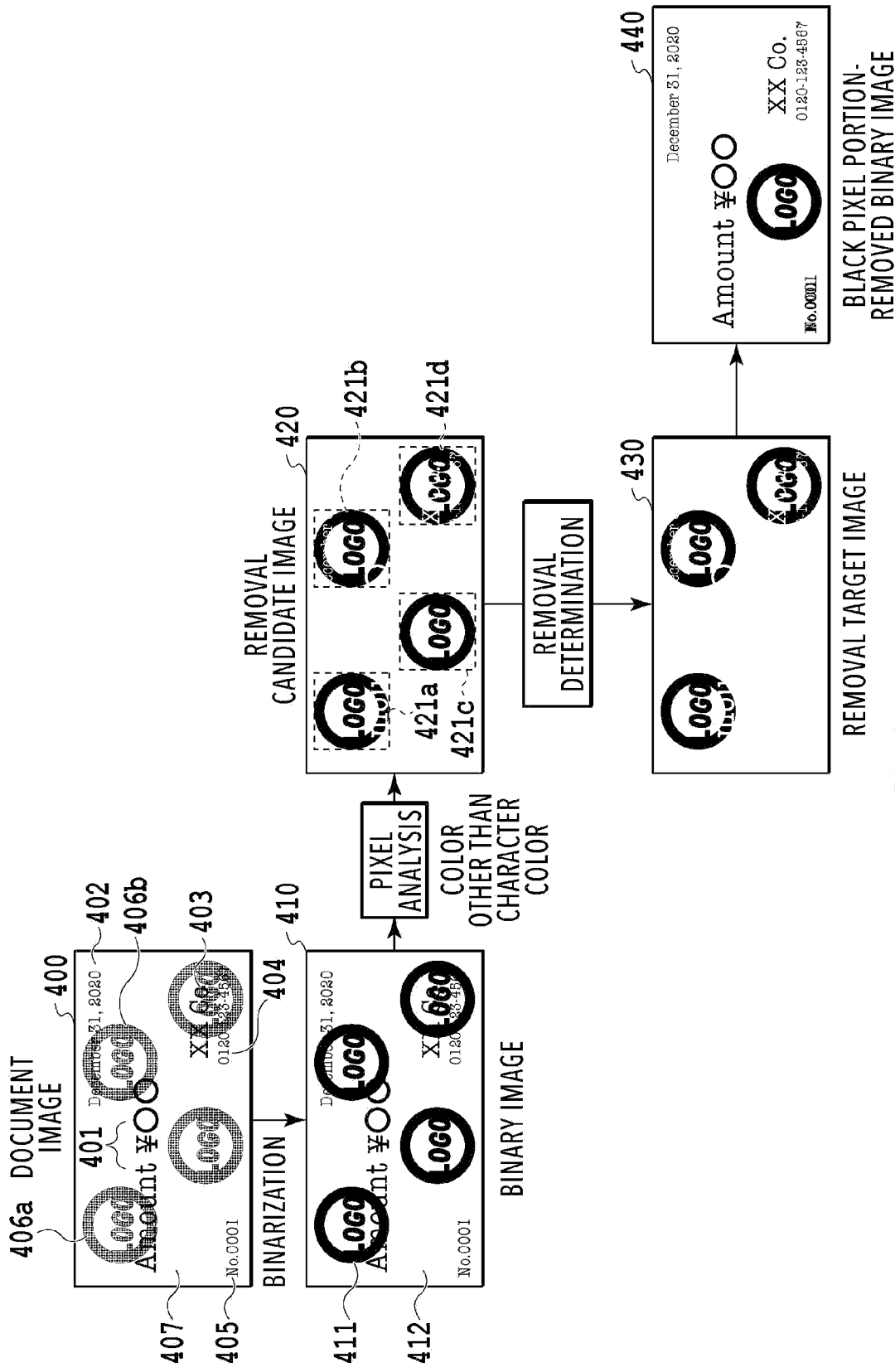
FIG. 4 is a diagram showing an application example of color background removal processing.

At S301, a binarization unit 201 performs binarization processing for the input document image. The binarization processing is processing to convert, for example, a full-color document image in which each pixel has a color value of 256 tones (eight bits) of each of R, G, and B into an image of two tones, that is, white and black, by taking luminance as a reference. Specifically, first, the RGB values of each pixel are converted by a predetermined conversion formula (for example, 0.299×R+0.587×G+0.114×B). Then, processing to take the pixel whose converted value is larger than a threshold value (in a case of a color darker than a reference level) as a black pixel whose pixel value is "1" and the pixel whose converted value is smaller than the threshold value (in a case of a color paler than the reference level) as a white pixel whose pixel value is "0". It is sufficient to determine the threshold value here based on the histogram of luminance in the input entire document image. The image (in the following, called "binary image") obtained by the binarization processing is stored in the RAM 113 or the HDD 114. Here, explanation is given by using a specific example. In FIG. 4, an image 400 shows an input document image and an image 410 shows a binary image obtained by performing binarization processing for the document image 400. Here, the document image 400 includes black character areas 401 to 405 corresponding to amount, date, company name, telephone number, and document ID, respectively, red non-character areas 406a to 406d corresponding to four logo marks, respectively, and a pale yellow margin area 407 corresponding to margin. As is obvious from a comparison between the document image 400 and the binary image 410, the luminance of the black character areas 401 to 405 and the red non-character area 406 within the document image 400 is low, and therefore, those become a black pixel area 411 in the binary image 410. On the other hand, the luminance of the margin area 407 within the document image 400 is high, and therefore, this becomes a white pixel area 412 in the binary image 410. The contents of the binarization processing are not limited to the example described above and what is required is the ability of converting the color of each pixel of a document image into two values, that is, white or black.

Figure 5:
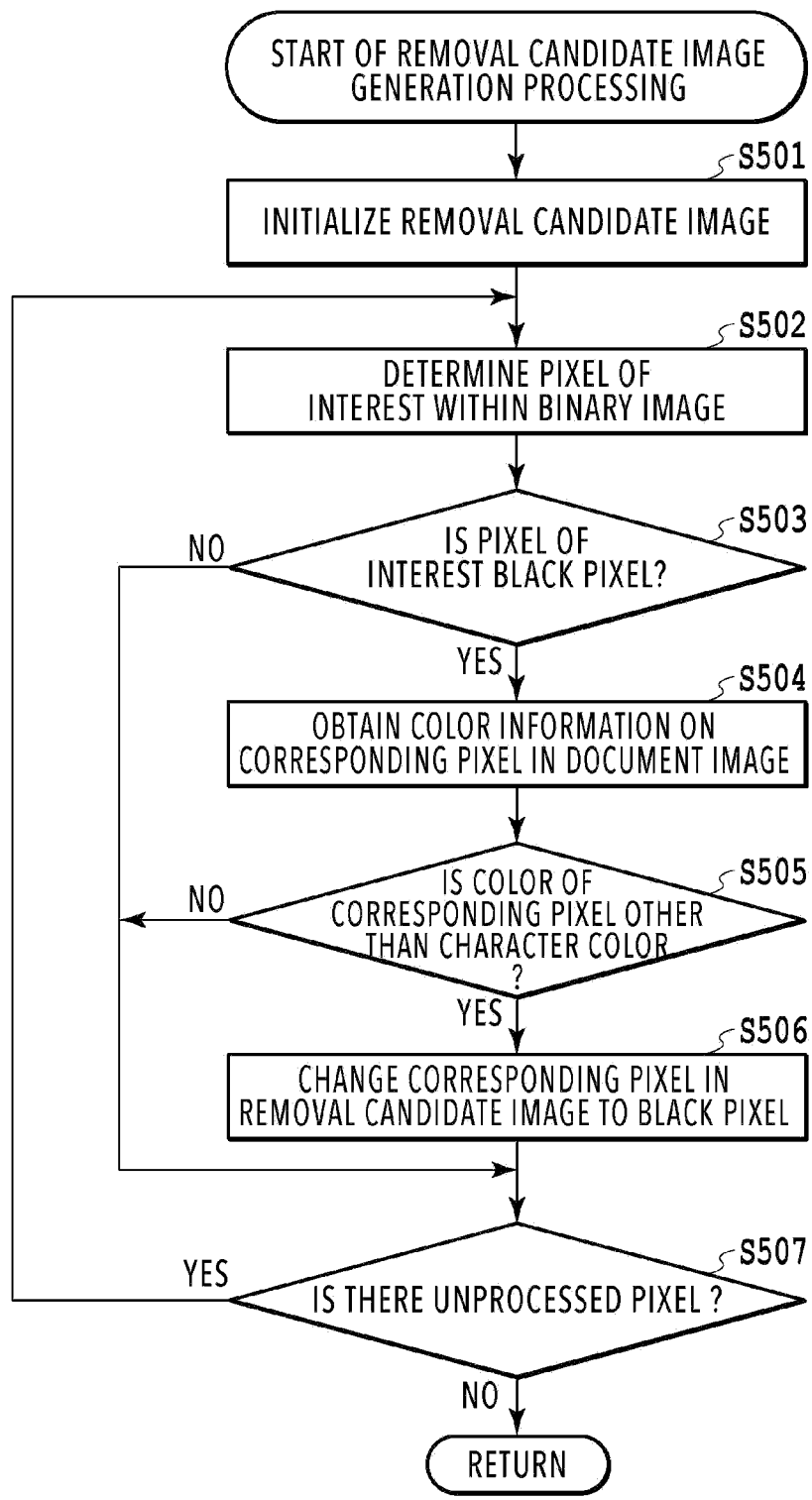
FIG. 5 is a flowchart showing details of removal candidate extraction processing according to the first embodiment.

Next, at S302, a removal candidate extraction unit 202 performs processing (in the following, called "removal candidate extraction processing") to extract a background object that is taken as a removal-target candidate among the background objects within the document image. FIG. 5 is a flowchart showing details of the removal candidate extraction processing. In the following, explanation is given along the flowchart in FIG. 5.

<<Removal Candidate Extraction Processing>>

First, at S501, an image (in the following, described as "removal candidate image") showing a background object that is taken as a removal candidate that is output as a result of this flow is initialized. Specifically, a blank image whose size is the same as that of the binary image generated at S301 and in which all pixels have the pixel values indicating white is generated within the RAM 103 as an initial value of the removal candidate image.

Next, at S502, from all the pixels constituting the binary image generated at S301, a pixel of interest is determined. The determination method of a pixel of interest is arbitrary and for example, it may be possible to determine the pixel of interest in order from the pixel in the top-left corner of the binary image. At S503 that follows, whether or not the pixel of interest determined at S502 is a black pixel is determined. In a case where the pixel value of the pixel of interest is "1" indicating black, the processing advances to S504 and in a case where the pixel value is "0" indicating white, the processing advances to S507.

At S504 in a case where the pixel of interest is a black pixel, color information (for example, RGB values or HSV values converted from RGB values) on the corresponding pixel in the document image, which exists at the same position as that of the pixel of interest, is obtained.

At S505 that follows, based on the color information on the corresponding pixel, which is obtained at S504, whether or not the corresponding pixel is a pixel having a color other than the character color is determined. In a case where the determination results indicate that the color indicated by the color information on the corresponding pixel is a color other than the character color, the processing advances to S506. On the other hand, in a case where the color indicated by the color information on the corresponding pixel is the same color as the character color, the processing advances to S507. Here, it is assumed that the character color is black. Based on this assumption, in a case where the color indicated by the color information on the corresponding pixel is a color other than black, the processing advances to S506 and in a case where the color is black, the processing advances to S507. The character color is not limited to black and it is possible for a user to designate any color as the character color.

At S506, the corresponding pixel in the current removal candidate image, which exists at the same position as that of the "corresponding pixel in the document image" described above, is changed to a black pixel.

At S507, whether or not the processing is completed for all the pixels constituting the binary image is determined. In a case where the processing of all the pixels is completed, this processing is exited. On the other hand, in a case where there is an unprocessed pixel, the processing returns to S502, and the next pixel of interest is determined and the processing is continued.

The above is the contents of the removal candidate extraction processing. Due to this, the removal candidate image is obtained, which is a binary image in which only the pixels constituting a character are changed to white pixels among the black pixels within the binary image obtained by performing binarization processing for the document image. An image 420 in FIG. 4 described above shows the removal candidate image obtained based on the document image 400 and the binary image 410. In the present embodiment, the removal candidate image is represented by two values, that is, the removal-target color background is represented by a black pixel and the other area is represented by a white pixel but it may also be possible to represent the color background area by a white pixel and the other area by a black pixel. Further, the removal candidate image may be an image in the format other than that of the binary image and it may also be possible to use a multivalued image or a grayscale image whose number of tones is smaller than 256. The data of the generated removal candidate image is stored in the RAM 113.

Explanation is returned to the flowchart in FIG. 3.

Next, at S303, a removal determination unit 203 analyzes the removal candidate image generated at S302 and obtains information (in the following, called "unit area information") indicating the position and size of each black pixel block within the removal candidate image. In the present embodiment, among black pixels included in the removal candidate image, an aggregate of black pixels adjacent to one another in the vertical, horizontal, or diagonal direction is defined as a black pixel block. Further, a plurality of black pixel blocks in which the shortest distance to the adjacent black pixel block is only about several pixels, or a plurality of black pixel blocks included in an area of a predetermined size is merged into one unit area. For example, in the case of the removal candidate image 420 shown in FIG. 4 described above, each area surrounded by each of broken-line frames 421a to 421d is the unit area. Further, in the present embodiment, the unit area is represented by a circumscribed rectangle and it is assumed that the unit area is specified by position coordinates of the leftmost portion and the uppermost portion of the included black pixel block and the width and height of the included black pixel block. In a case where it is possible to grasp the position and size of the black pixel block within the removal candidate image, it may also be possible to define the unit area information by another method. The unit area information indicating each black pixel block within the removal candidate image, which is obtained as described above, is stored in the RAM 113.

Figure 6:
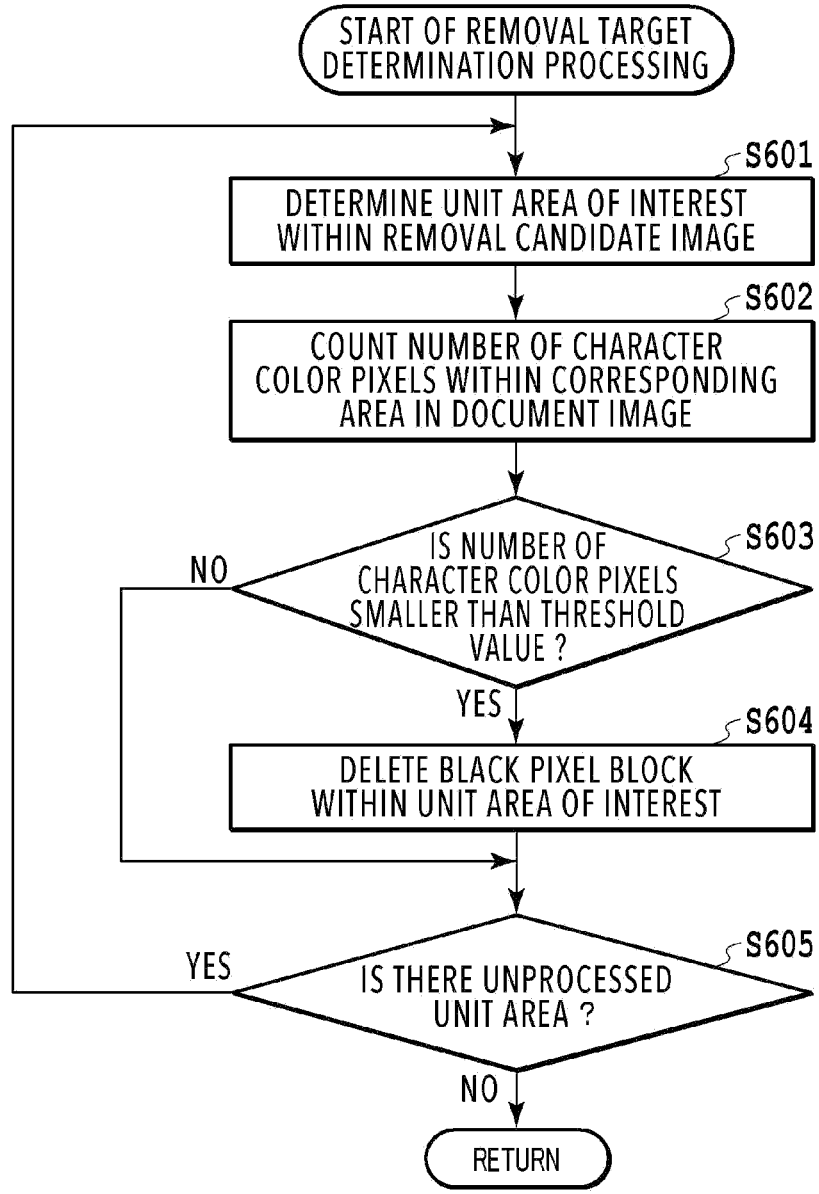
FIG. 6 is a flowchart showing details of removal target determination processing according to the first embodiment.

Next, at S304, the removal determination unit 203 performs processing (removal target determination processing) to determine the black pixel block that is removed actually among the black pixel blocks within the removal candidate image generated at S302 for each unit area based on the unit area information obtained at S303. FIG. 6 is a flowchart showing details of the removal target determination processing according to the present embodiment. In the following, explanation is given along the flowchart in FIG. 6.

<<Removal Target Determination Processing>>

At S601, based on the obtained unit area information, among all the unit areas existing within the removal candidate image, a unit area of interest is determined. Next, at S602, by taking the area within the document image, which corresponds to the unit area determined at S601, as a target, the number of pixels (in the following, called "character color pixel") having the same color as the character color existing within the area is counted. Here, explanation is given by using a specific example. In FIG. 4 described above, it is assumed that the unit area 421a among the four unit areas 421a to 421d in the removal candidate image 420 is the unit area of interest. Here, the character color is black, and therefore, in this case, the number of black pixels constituting the character "A" existing within the corresponding area of the document image 400 is counted.

Next, at S603, whether the number of character color pixels counted at S602 is smaller than a threshold value is determined. It may be possible to determine in advance the threshold value in this case by taking into consideration about how many character color pixels need to exist within the unit area are for the pixels to be able to become those representing a character based on the size of the minimum character that can be the target of recognition in OCR processing, and the like. In a case where the counted number of pixels is smaller than the threshold value, it is determined that no character exists within the unit area of interest and the processing advances to S604. On the other hand, in a case where the counted number of pixels is larger than or equal to the threshold value, it is determined that a character exists in the unit area of interest and the processing advances to S605.

At S604, processing to delete the black pixel block within the unit area of interest from the removal candidate image is performed. Specifically, processing to replace the black pixel within the unit area of interest with a white pixel is performed. In the example described previously, among the corresponding areas within the document image 400, each area corresponding to each of the frames 421a, 421b, and 421d includes some character, and therefore, the number of character color pixels within each area exceeds the threshold value. Consequently, the black pixel blocks in the unit areas 421a, 421b, and 421d within the removal candidate image 420, which correspond to those frames, remain without being deleted. On the other hand, the area within the document image 400, which corresponds to the frame 421c, includes no character and the number of character color pixels is smaller than the threshold value, and therefore, the black pixel block in the unit area 421c is deleted from the removal candidate image 420. As a result of that, a removal target image 430 shown in FIG. 4 is obtained.

At S605, whether or not the processing is completed for all the unit areas indicated by the obtained unit area information is determined. In a case where the processing is completed for all the unit areas, this processing is exited. On the other hand, in a case where there is an unprocessed unit area, the processing returns to S601, and the next unit area of interest is determined and the processing is continued.

The above is the contents of the removal target determination processing. For example, it is assumed that only the characters "No. 001" representing the document ID in the document image 400 are different from the other characters and whose color is the same as the color of the logo mark 406. In this case, with the method of the present embodiment, the pixel area constituting the character portion is also taken as the target of a removal candidate. Consequently, in such a case, it is sufficient to additionally perform determination of whether each unit area is a character area or a non-character area and delete the black pixel block in the unit area determined to be a character area from the removal candidate image. Due to this, even in a case where a character whose color is the same as that of the logo mark and the like, which is taken as the target of removal, is included within a document, it is possible to leave the character portion in the character portion-removed binary image.

Explanation is Returned to the Flowchart in FIG. 3.

Next, at S305, a background processing unit 204 performs processing to remove the removal-target background area specified by the removal target image generated at S304 from the binary image generated at S301. In the case of the present embodiment, processing to convert the black pixel among the black pixels within the binary image obtained at S301 into a white pixel is performed, which is located at the same position as that in the removal target image. In the example in FIG. 4 described previously, as a result of the portion of the black pixel of the removal target image 430 being removed from the binary image 410, a black pixel portion-removed binary image 440 is obtained. In this example, among the unit areas 421a to 421d corresponding to the four logo marks, the black pixel block in the unit area 421c is deleted from the removal candidate image 420. Consequently, in the black pixel portion-removed binary image 440, only the black pixel block representing the logo mark corresponding to the unit area 421c among the four logo marks remains and the black pixel blocks representing the other logo marks disappear. By performing OCR processing for the black pixel portion-removed binary image from which the logo mark or the like overlapping a character is erased as described above, it is made possible to extract character information with a high accuracy.

The above is the contents of the processing to remove a color background object overlapping a character object from a document image according to the present embodiment. Modifications by which the same effects as those described above can be obtained within the scope not deviating from the gist of the present embodiment fall within the category of the present embodiment.

As above, according to the present embodiment, it is possible to remove a pixel area representing a color background overlapping a character portion within a document from a binary image of a document image. As a result of that, it is possible to extract character information with a high accuracy even from a document image in which a color logo mark or the like overlaps the background of a character.

Second Embodiment

In the first embodiment, the case is supposed where a color logo mark or the like overlaps a black color character portion within a document image as a background and the color background overlapping the black character portion is removed. However, a case is also contemplated where character objects having a plurality of colors (for example, black character and blue character) exists within a document image and a red logo mark or the like overlaps them as a background object. An aspect is explained as a second embodiment in which in a case where a color character exists separately from a black character within a document image as described above, a color background overlapping the color character portion is also removed appropriately to enable a highly accurate OCR processing. Explanation of the contents common to those of the first embodiment, such as the basic system configuration, is omitted and in the following, different points are explained mainly.

<Color Background Removal Processing>

Figure 7:
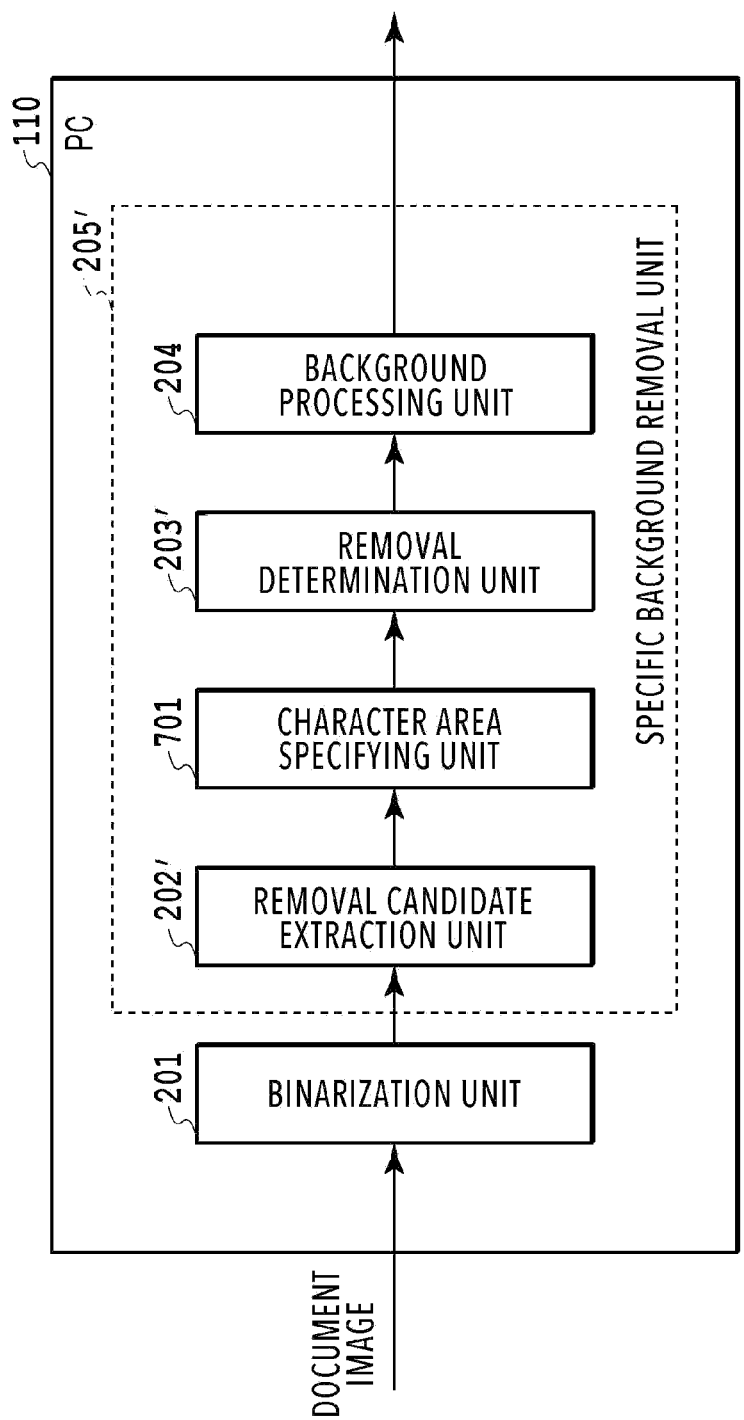
FIG. 7 is a block diagram showing functions for implementing color background removal processing according to a second embodiment.
Figure 8:
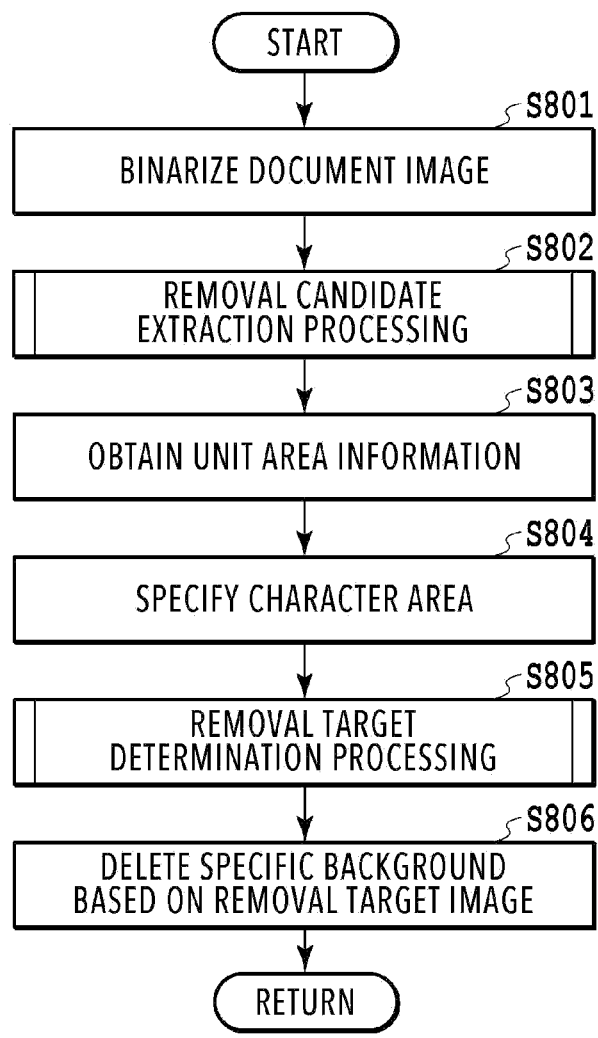
FIG. 8 is a flowchart showing a flow of color background removal processing according to the second embodiment.

FIG. 7 is a block diagram showing function units for implementing the color background removal processing according to the present embodiment. Further, FIG. 8 is a flowchart showing a flow of the color background removal processing according to the present embodiment. In the following, with reference to the block diagram in FIG. 7 and the flowchart in FIG. 8, the color background removal processing of the present embodiment is explained.

Figure 9:
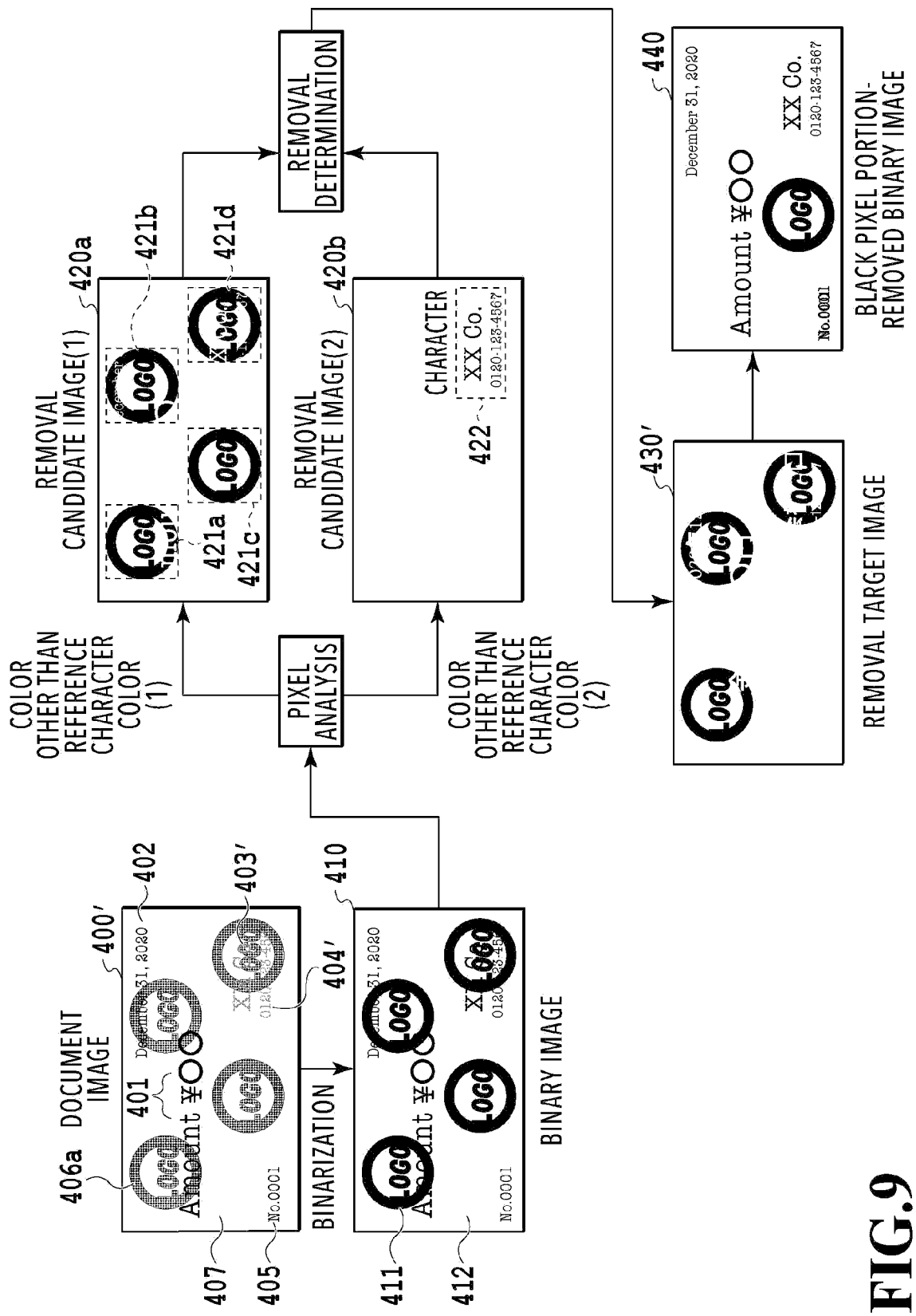
FIG. 9 is a diagram showing an application example of color background removal processing.

S801 is the same as S301 of the first embodiment and at which the binarization unit 201 performs binarization processing for an input document image. Here, explanation is given by using a specific example. In FIG. 9, an image 400' shows an input document image and an image 410' shows a binary image obtained by performing binarization processing for the document image 400'. The document image 400' shown in FIG. 9 differs from the document image 400 shown in FIG. 4 in that the character objects representing the company name and the telephone number are blue, not black. In the following, the standard character color, that is, black is called a "reference character color". The reference character color may be a color designated by a user, other than black. Further, in the binary image 410, which is the results of binarization processing, there is no difference in the character color.

Figure 10:
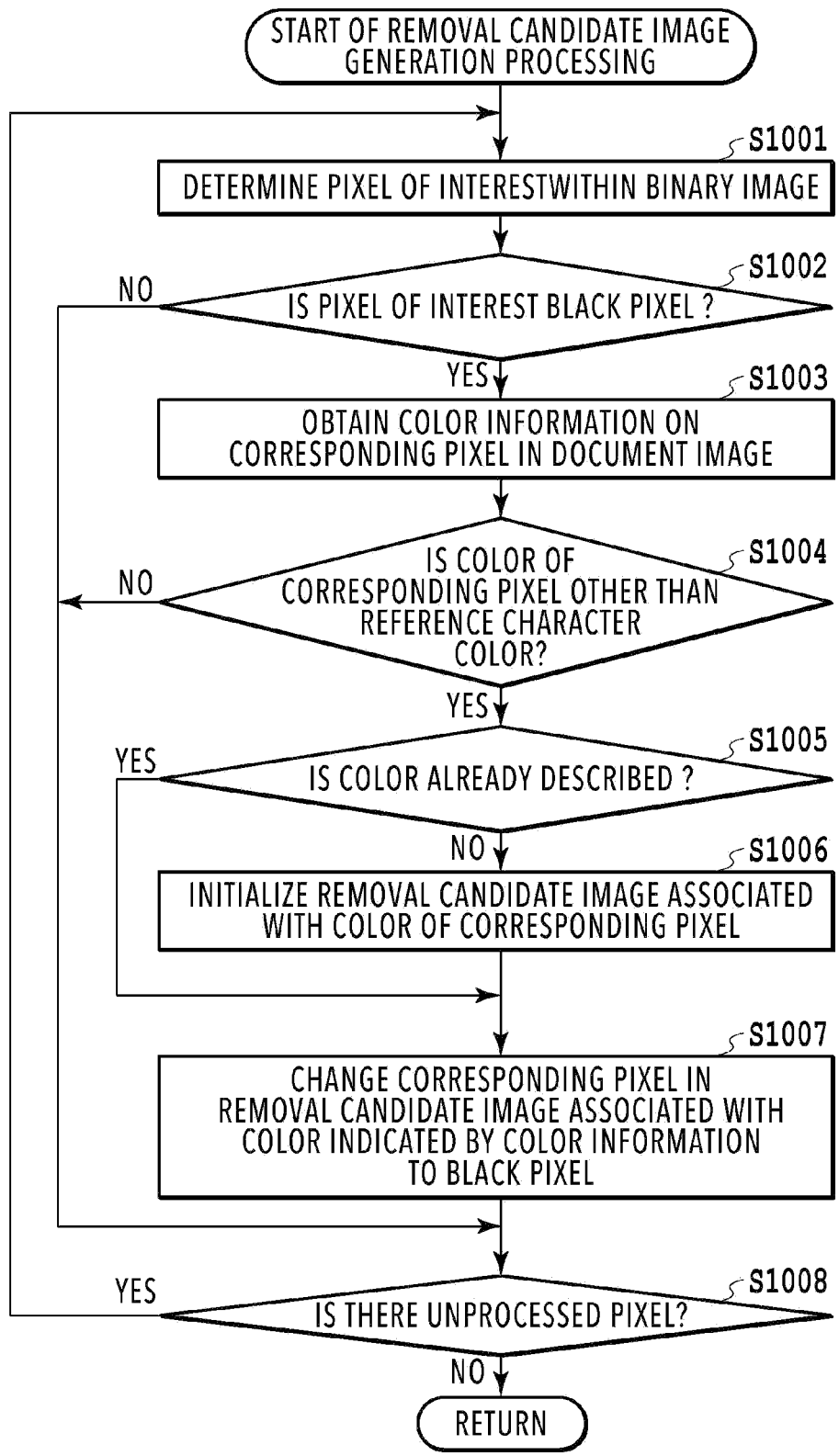
FIG. 10 is a flowchart showing details of removal candidate extraction processing according to the second embodiment.

At S802 that follows, a removal candidate extraction unit 202' performs removal candidate extraction processing to extract the background area, which is taken as a removal-target candidate, in the background area except for the character portion having the reference character color within the document image. FIG. 10 is a flowchart showing details of the removal candidate extraction processing according to the present embodiment. In the following, explanation is given along the flowchart in FIG. 10.

<<Removal Candidate Extraction Processing>>

S1001 to S1004 correspond to S502 to S505 respectively in the flowchart in FIG. 5 of the first embodiment. That is, a pixel of interest is determined first from among all the pixels constituting the binary image generated at S801 (S1001). Next, whether or not the determined pixel of interest is a black pixel is determined (S1002) and in a case where the pixel value of the pixel of interest is "1" representing black, the processing advances to S1004 and in a case where the pixel value is "0" representing white, the processing advances to S1008. In a case where the pixel of interest is a black pixel, color information on the corresponding pixel in the document image, which exists at the same position as that of the pixel of interest, is obtained (S1003) and based on the obtained color information on the corresponding pixel, whether or not the corresponding pixel is a pixel having a color other than the reference character color is determined (S1004). In a case where the determination results indicate that the color indicated by the color information on the corresponding pixel is a color other than the reference character color, the processing advances to S1005 and in a case where the color is the same as the reference character color, the processing advances to S1008. Here, the reference character color is black, and therefore, in a case where the corresponding pixel is a pixel belonging to a blue character area or in a case where the corresponding pixel is a pixel belonging to a red color background area, the processing advances to S1005 and in a case where the corresponding pixel is s pixel belonging to a black character area, the processing advances to S1008.

At S1005, whether or not the color indicated by the color information on the corresponding pixel is an already described color is determined. Specifically, whether the same color as the color indicated by the color information on the corresponding pixel exists in the colors indicated by the color information stored in the RAM 113 at S1006, which is the immediately previous routine, is checked. In a case where the color indicated by the color information on the corresponding pixel is an already described color, the processing advances to S1007 and in a case where the color is not an already described color, the processing advances to S1006.

At S1006, the color information on the corresponding pixel having the color determined to be a color other than the reference character color is stored in the RAM 113 and at the same time, initialization of the removal candidate image associated with the color indicated by the color information on the corresponding pixel is performed. For example, in a case where the color indicated by the color information on the corresponding pixel is red, a removal candidate image initialized for red is generated and in a case where the color indicated by the color information on the corresponding pixel is blue, a removal candidate image initialized for blue is generated.

Then, at S1007, among the pixels of the removal candidate image associated with the color indicated by the color information on the corresponding pixel, the pixel existing at the same position as that of the above-described "corresponding pixel" is changed to a black pixel. For example, in a case where the color indicated by the color information on the corresponding pixel is red, the pixel within the removal candidate image associated with red is converted into a black pixel and in a case where the color indicated by the color information on the corresponding pixel is blue, the pixel within the removal candidate image associated with blue is converted into a black pixel.

At S1008, whether or not the processing is completed for all the pixels constituting the binary image is determined. In a case where the processing of all the pixels is completed, this processing is exited. On the other hand, in a case where there is an unprocessed pixel, the processing returns to S1001, and the next pixel of interest is determined and the processing is continued.

The above is the contents of the removal candidate extraction processing according to the present embodiment. Due to this, one or more removal candidate images corresponding to a color or colors other than the reference character color are generated. In the example in FIG. 9 described previously, two images, that is, an image 420*a* associated with red and an image 420*b* associated with blue are generated as the removal candidate image. Other than the above-described method, it may also be possible to use a method in which, for example, color information on the corresponding pixel in the document image, which is a black pixel in the binary image, is extracted and aggregated and after the color information is classified into a plurality of clusters by using a method, such as clustering, and the removal candidate image corresponding to each cluster is generated. The data of the one or more removal candidate images thus generated is stored in the RAM 113.

Explanation is returned to the flowchart in FIG. 8.

Next, at S803, a removal determination unit 203' analyzes each of the one or more removal candidate images generated at S802 and obtains unit area information indicating the position and size of each black pixel block within each removal candidate image. The method of obtaining unit area information from each removal candidate image is the same as that explained in the first embodiment.

Next, at S804, a character area specifying unit 701 specifies whether the area represented by each piece of unit area information is a character area or a non-character area based on the unit area information obtained at S803 and labels each piece of unit area information. The character area specifying unit 701 specifies that the area represented by the unit area information is a character area in a case where the area satisfies conditions set in advance for the area size, the pixel density, and the area shape. Then, the character area specifying unit 701 attaches a "character label" indicating being a character object to the unit area information in a case where the area is specified as a character area, and attaches a "non-character label" indicating not being a character object to the unit area information in a case where the area is specified as a non-character area. It may also be possible to use another method for specification of whether being a character object or a non-character object and for example, it may also be possible to specify whether being a character object or a non-character object by determining whether it is possible to recognize a character in the area by using simple OCR processing. The character area specifying unit 701 performs the processing such as this for each removal candidate image.

Figure 11:
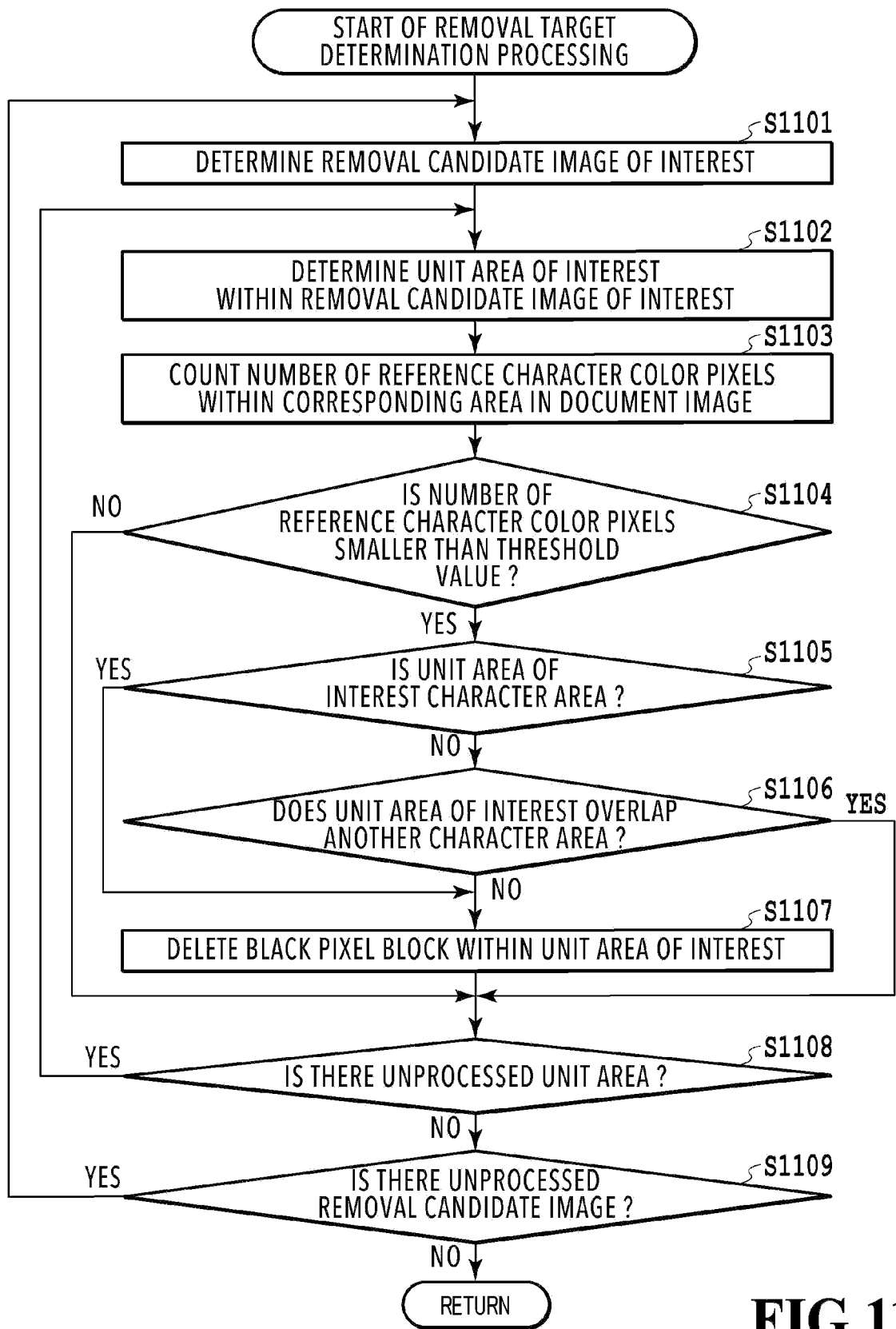
FIG. 11 is a flowchart showing details of removal target determination processing according to the second embodiment.

Next, at S805, the removal determination unit 203' performs the removal target determination processing to determine the black pixel block for each unit area, which is actually removed among the black pixel blocks within each removal candidate image, based on the unit area information obtained at S803. FIG. 11 is a flowchart showing details of the removal target determination processing according to the present embodiment. In the following, explanation is given along the flowchart in FIG. 11.

<<Removal Target Determination Processing>>

At S1101, a removal candidate image of interest is determined from among the one or more removal candidate images generated at S802. Next, at S1102, based on the unit area information obtained in relation to the removal candidate image of interest, a unit area of interest is determined among all the unit areas existing within the removal candidate image.

Next, at S1103, by taking the area within the document image, which corresponds to the unit area of interest determined at S1102, as a target, the number of reference character color pixels having the same color as the reference character color, which exist within the area, is counted.

Next, at S1104, whether the number of reference character color pixels counted at S1103 is smaller than a threshold value is determined. In a case where the counted number of pixels is smaller than the threshold value, the processing advances to S1105 and in case where the counted number of pixels is larger than or equal to the threshold value, the processing advances to S1108.

At S1105, whether the unit area of interest is a character area is determined based on the label attached to the unit area information. In a case where the character label is attached, the processing advances to S1207 and in a case where the non-character label is attached, the processing advances to S1106.

At S1106, whether the unit area of interest overlaps another character area is determined. Specifically, first, whether there exists another area that overlaps the unit area of interest is searched and in a case where such an area exists, whether the label attached to the unit area information on the other area is the character label is checked. In a case where an overlapping another area exists and the character label is attached, it is determined that the unit area of interest overlaps another character area and the processing advances to S1108. On the other hand, in a case where overlapping another area does not exist or in a case where overlapping another area exists but the non-character label is attached, it is determined that the unit area of interest does not overlap another character area and the processing advances to S1107.

At S1107, processing to delete the black pixel block within the unit area of interest from the removal candidate image is performed. Specifically, processing to replace the black pixel within the unit area of interest with a white pixel is performed.

At S1108, whether or not the processing is completed for all the unit areas indicated by the unit area information obtained in relation to the removal candidate image of interest is determined. In a case where the processing is completed for all the unit areas, this processing is exited. On the other hand, in a case where there is an unprocessed unit area, the processing returns to S1102, and the next unit area of interest is determined and the processing is continued.

At S1109, whether or not the processing is completed for all the removal candidate images generated at S802 is determined. In a case where the processing is completed for all the removal candidate images, this processing is exited. On the other hand, in a case where there is an unprocessed removal candidate image, the processing returns to S1101, and the next removal candidate image of interest is determined and the processing is continued.

The above is the contents of the removal target determination processing according to the present embodiment. The processing so far is explained with reference to a specific example in FIG. 9. First, in a case of the removal candidate image 420a associated with red, among the corresponding areas within the document image 400', each area corresponding to the frames 421a, 421b, and 421d includes some character. Consequently, the number of reference character color pixels within each area exceeds the threshold value (NO at S1104), and therefore, the black pixel blocks in the unit areas 421a, 421b, and 421d within the removal candidate image 420a, which correspond to these frames, remain without being deleted. On the other hand, the corresponding area within the document image 400', which corresponds to the frame 421c, includes no character, and therefore, the number of character color pixels is smaller than the threshold value (YES at S1104), the area is not a character area (NO at S1105), and the area does not overlap another character area (NO at S1106). Consequently, the black pixel block in the unit area 421c is deleted from the removal candidate image 420a (S1107). Next, in a case of the removal candidate image 420b associated with blue, among the corresponding areas within the document image 400', the number of reference character color pixels within the area corresponding to a frame 422 is smaller than the threshold value (YES at S1104), but the area is a character area (YES at S1105). Consequently, the black pixel block in the unit area 422 is deleted from the removal candidate image 420b (S1107). By integrating the results thus obtained, a removal target image 430' similar to the removal target image 430 in FIG. 4 of the first embodiment is obtained.

As above, according to the present embodiment, in a case where a color character exists separately from a black character within the document image, it is possible to appropriately remove a color background overlapping the color character portion as well. Due to this, it is possible to perform OCR processing with a high accuracy for both the black character and the color character, both being overlapped by a color background, and therefore, it is made possible to appropriately extract character information from the document image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, even in a case where a background, such as a logo mark, overlaps a character portion, it is possible to extract character information with a high accuracy.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-073188, filed Apr. 23, 2021 which is hereby incorporated by reference wherein in its entirety.

What is claimed is:

1. An image processing apparatus comprising:
one or more memories storing instructions; and
one or more processors executing the instructions to:
   generate, by performing binarization processing for a document image obtained by reading a document, a first binary image including first pixels representing a color darker than a reference level in the document image and second pixels representing a color paler than the reference level;
   generate, based on the generated first binary image, a removal candidate image which represents a background object whose color is different from a color of a character object in the document image; and
   generate a second binary image in which a background object that overlaps the character object in the document image is removed, by performing a changing processing to change one of the first pixels included in the first binary image corresponding to a unit area in which the number of pixels having the color of the character object within a corresponding area of the document image is more than a threshold value among the unit areas representing each background object in the removal candidate image to one of the second pixels.

2. The image processing apparatus according to claim 1, wherein in a case where there is a plurality of colors as the color of the character object, the removal candidate image is generated in which a background object whose color is different from a reference character color among the plurality of colors is taken as a target of removal.

3. The image processing apparatus according to claim 2, wherein in a case where there is a plurality of colors different from the reference character color as a color of the background object, a plurality of the removal candidate images is generated in association with each of the different colors.

4. The image processing apparatus according to claim 3, wherein color information on pixels in the document image is obtained, which corresponds to the first pixel among the pixels constituting the generated first binary image, the color information is classified into a plurality of clusters by using a method of clustering, and a plurality of the removal candidate images corresponding to each of a plurality of colors is generated.

5. The image processing apparatus according to claim 1, wherein in a case where the unit area is a character area, the changing processing is not performed for the unit area.

6. The image processing apparatus according to claim 5, wherein in a case where the unit area is non-character area and overlaps another character area, the changing processing is not performed for the unit area.

7. The image processing apparatus according to claim 1, wherein the unit area is an area corresponding to an aggregate of pixels adjacent to one another among pixels representing the background object included in the removal candidate image.

8. The image processing apparatus according to claim 1, wherein a format of the removal candidate image is one of color, grayscale, and binary.

9. The image processing apparatus according to claim 1, wherein the color of the character object is black or a color designated by a user.

10. The image processing apparatus according to claim 2, wherein the reference character color is black or a color designated by a user.

11. The image processing apparatus according to claim 1, wherein by further performing OCR processing for the generated second binary image, character information on the document image is obtained.

12. An image processing method comprising the steps of:
generating, by performing binarization processing for a document image obtained by reading a document, a first binary image including first pixels representing a color darker than a reference level in the document image and second pixels representing a color paler than the reference level;

generating, based on the generated first binary image, a removal candidate image which represents a background object whose color is different from a color of a character object in the document image; and generating a second binary image in which a background object that overlaps the character object in the document image is removed, by performing a changing processing to change one of the first pixels included in the first binary image corresponding to a unit area in which the number of pixels having the color of the character object within a corresponding area of the document image is more than a threshold value among the unit areas representing each background object in the removal candidate image to one of the second pixels.

13. A non-transitory computer readable storage medium storing a program for causing a computer to perform an image processing method comprising the steps of:

generating, by performing binarization processing for a document image obtained by reading a document, a first binary image including first pixels representing a color darker than a reference level in the document image and second pixels representing a color paler than the reference level;

generating, based on the generated first binary image, a removal candidate image which represents a background object whose color is different from a color of a character object in the document image; and generating a second binary image in which a background object that overlaps the character object in the document image is removed, by performing a changing processing to change one of the first pixels included in the first binary image corresponding to a unit area in which the number of pixels having the color of the character object within a corresponding area of the document image is more than a threshold value among the unit areas representing each background object in the removal candidate image to one of the second pixels.

\* \* \* \* \*